June 16, 1936.  W. D. BELL  2,043,986
APPARATUS FOR LUBRICATING
Filed Nov. 7, 1927
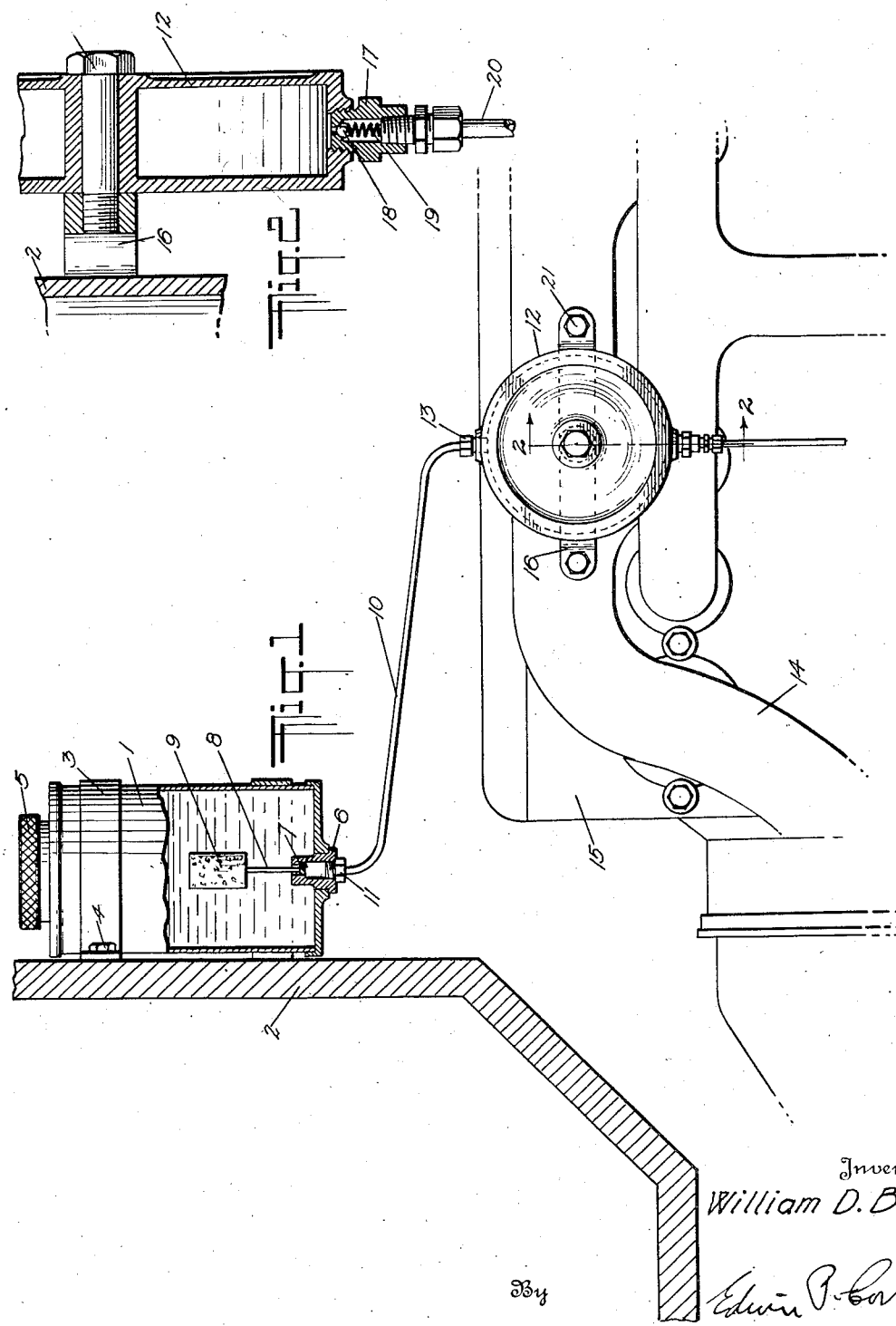
Inventor
William D. Bell.
By
Edwin P. Carter
Attorney

Patented June 16, 1936

2,043,986

UNITED STATES PATENT OFFICE 2,043,986

APPARATUS FOR LUBRICATING

William D. Bell, Columbus, Ohio, assignor, by mesne assignments, to Auto Research Corporation, a corporation of Delaware Application November 7, 1927, Serial No. 231,495

14 Claims. (Cl. 184—7)

This invention relates to method and apparatus for lubricating. It is particularly applicable to the lubrication of motor vehicles but is also applicable to the lubrication of other types of machinery. It relates primarily to that type of apparatus wherein a plurality of tubes or conduits lead to various bearing points which should be supplied with lubricant automatically or at frequent intervals, such as those arrangements commonly referred to as centralized lubricating systems.

Several types of centralized lubricating systems are in use at the present time, all of them making use of some form of plunger pump for forcing the oil through the system and into the bearings. In some cases, the pump is to be operated by hand; in others, by means of gearing deriving its motion from vibration of the machine or by connection to some moving part. In any case, the pumps are very similar and each requires a cylinder, a piston or plunger, and a more or less complicated operating mechanism in addition to the usual inlet and discharge valves. From their nature, they are expensive to construct and difficult to maintain in proper condition.

The hand operated devices are not as desirable as they might be because there is a tendency for the operator to forget to operate them. Furthermore, all of these prior art devices are likely to become inoperative through neglect.

One of the objects of this invention is to provide a device that will accomplish the purpose of the usual plunger pump and yet will be simpler and cheaper to construct, more satisfactory in use, and entirely automatic in operation.

Another object of the invention is to produce and utilize temperature changes in the lubricant to bring about the automatic segregation of small portions of the lubricant from the main supply and to deliver parts of such portions to a centralized lubricating system without the use of moving parts.

In my method and apparatus, a small quantity of the lubricant or other fluid is isolated in a chamber or bulb preferably located close to or upon some part of the machine that becomes heated in operation. Heat is accordingly transferred to this bulb when the machine is started and is lost by radiation when the machine is stopped. The heating is used to force the lubricant into the lubricating system by means of the expansion of this lubricant or other fluid, while the cooling is used to draw lubricant to the bulb from the source of supply by means of the contraction of the fluid, properly arranged valves and conduits being provided to accomplish these results.

The preferred embodiment of the apparatus used by me in performing my method is shown in the accompanying drawing wherein similar characters of reference designate corresponding parts and wherein:

Figure 1 is a side view of the engine of a motor vehicle showing one manner in which my apparatus may be applied thereto.

Figure 2 is a sectional view taken on line 2—2 of Figure 1.

In the drawing, the numeral 1 designates a lubricant reservoir that may be of any desired size or shape and shown located upon the dash 2 of the motor vehicle. The location of this reservoir may vary.

The reservoir is attached to the dash by means of straps 3 and bolts 4 and is provided with a filler cap 5 and an outlet connection 6 containing a check valve 7. This check valve 7 is constructed and mounted to open downwardly and outwardly and has a stem 8 which carries a float 9. A filtering screen (not shown) may be provided around or in the outlet connection 6.

A tube or conduit 10 is connected at one end to the outlet connection 6 by means of a threaded connection 11 and at its opposite end to a chamber or bulb 12 by means of a threaded connection 13. The chamber or bulb 12 may be of any desired shape, being shown in cylindrical form. It is provided with an outlet connection 17 containing a check valve 18 normally held in seated position by means of a spring 19. This outlet connection 17 connects the chamber or bulb 12 with the usual distributing conduit or tube 20. This bulb 12 may be connected to the exhaust pipe 14 of the motor 15 by means of a bracket 16 and bolts 21.

In the normal operation of this device, with the entire system full of a suitable lubricant and at or near atmospheric pressure, the starting of the motor serves to heat the bulb 12 by radiation from the exhaust pipe and other parts of the motor and by conduction through the bracket 16. The fluid contained in the bulb becomes heated and expands. Since the increased bulk of the fluid cannot flow back into the reservoir because of the check valve 7, the pressure within the bulb 12 will cause it to pass through the check valve 18, in through the conduit 20 and thence to the bearings about the machine. When the motor is stopped, the bulb 12 and its contents will cool by radiation, the fluid will contract and sufficient lubricant will flow from the reservoir through the check valve 7 to equalize the pressure and replace the fluid which has been discharged during the heating process. The foregoing cycle of operations is repeated each time the motor is started and stopped, resulting in effective lubrication of the machine and replenishment of the lubricant in the bulb 12.

The float 9 on the stem 8 is provided to support the check valve 7 in normally closed position at all times when there is a sufficient supply of lubricant in the reservoir 1. In the event the level of the lubricant in the reservoir becomes low, the float 9 will no longer support the valve 7 in closed position but will cause it to remain open and the expansion and contraction of the fluid in the bulb 12 will result in the lubricant flowing back and forth through the valve 7 instead of discharging through the valve 19. This arrangement effectively prevents any air being drawn into the system which would interefere with the proper operation of the system.

For convenience, the bulb 12 is shown as mounted upon the exhaust manifold of a motor. In practice, this bulb may be mounted upon the frame of the machine or in any other convenient location where it will be alternately heated and cooled as the motor is started and stopped. Also, changes in the arrangement of the various parts of the device may be made to adapt it to the particular machine to which it is applied.

It will be seen that I have provided a method which is extremely simple and which permits of the utilization of apparatus which is entirely automatic and which is substantially free of moving parts and therefore free of disarrangement or inoperativeness due to wear or neglect. My method is such that the apparatus used by me is only caused to operate at the starting and stopping of the motor, the frequency of these operations being ample to effectively lubricate the machine and not to over-lubricate.

It will be understood that the lubricant need not be relied upon alone in obtaining the expansive and contractive actions necessary for feeding this lubricant into or out of the bulb 12. It is possible to use another fluid in the bulb with the lubricant and to effect their automatic separation to insure delivery to the lubricating conduits by specific gravity.

Having thus described my invention, what I claim is:

1. In combination with a motor vehicle, a lubricant container for connection to a lubricating conduit, means for automatically maintaining said container completely filled with lubricant throughout operation, and means for causing the expulsion of the lubricant from said container into said conduit by the expansive force of the lubricant due to increased temperature resulting from the motor.

2. In a lubricating system, a source of lubricant supply, a chamber connected to said source of lubricant supply, a lubricant delivery conduit connected to said chamber, and means for causing lubricant to be forced into said conduit by expansion of the lubricant in said chamber in response to increased temperature and to be drawn into said chamber from said source of supply in response to decreased temperature, said means being such that the pressure in said chamber is automatically relieved upon depletion of the lubricant in said source of supply to a predetermined extent.

3. In a lubricating system, a source of lubricant supply, a chamber connected to said source of lubricant supply, a lubricant delivery conduit connected to said chamber, and means for causing lubricant to be forced into said conduit by expansion of the lubricant in said chamber in response to increased temperature and to be drawn into said chamber from said source of supply in response to decreased temperature, said means being such as to become automatically inoperative when the lubricant in said source of supply becomes depleted to a predetermined extent.

4. In a lubricating system, a source of lubricant supply, a chamber connected to said source of lubricant supply, a float controlled valve normally preventing the passage of lubricant from said chamber back into said source of supply, a lubricant delivery conduit connected to said chamber, and means for causing said lubricant to be forced into said conduit by expansion of the lubricant in said chamber in response to increased temperature and to be drawn into said chamber from said source of supply in response to decreased temperature, said float controlled valve being held open when the lubricant in the source of supply is depleted to a predetermined point to automatically relieve the pressure in said chamber.

5. A lubricating system comprising a reservoir, a branched conduit having an inlet at said reservoir and adapted to receive oil therefrom and having a plurality of outlets and a check valve at the inlet, said branched conduit being formed of a material having a lower coefficient of expansion than the oid with which the system is adapted to be used and being arranged in direct heat conducting relation with the exhaust manifold of an internal combustion engine, whereby oil will be sucked into said system when the system is cooled and discharged from said system when it is heated.

6. In a lubricating system, a vented supply reservoir, having an outlet, an outwardly opening check valve controlling said outlet, a distributing conduit arranged to receive lubricant from said reservoir through said check valve upon suction occasioned by thermostatic action, and float means for yieldably holding said check valve in closed position.

7. In a central lubricating system for the chassis of a motor vehicle, the combination of a service reservoir having an inlet connected with a source of supply, and an outlet adapted for connection to the distributing conduits, said reservoir being otherwise completely closed, a check valve preventing return flow from the service reservoir to the source of supply, said service reservoir being mounted in heat interchange relation with a part heated in engine operation for propulsion of lubricant therefrom through the distributing system under the expansive force evolved by heating of the lubricant contents of said reservoir.

8. In an automatic lubricating system, a lubricant filled expansion chamber, means associated with a motor for intermittently heating said chamber, a lubricant supply tank, an inlet for connecting said tank with said chamber, a lubricant discharge outlet connected with said chamber, check valves being provided in said inlet and outlet for permitting lubricant to be forced out only through said outlet when the chamber is heated and to be drawn in only through said inlet when the source of heat is withdrawn.

9. In an automatic lubricating system for the chassis bearings of an automobile provided with a motor and exhaust pipe, an expansion chamber mounted in close proximity to the exhaust pipe of the motor, a source of lubricant supply, an inlet conduit to said chamber from said source of supply, an outlet conduit from said chamber to a bearing, check valves in said inlet and outlet conduits, said chamber, inlet and outlet conduits being completely filled with lubricant between said check valves and said chamber, the lubricant in said chamber being heated by the exhaust pipe when the motor is started to force the lubricant by the hydraulic pressure of expansion of said lubricant through the outlet conduit past the check valve therein the check valve in said inlet conduit being closed and upon stopping of the motor and subsequent contraction of the lubricant in said chamber the check valve in said outlet conduit closing and the check valve in said inlet conduit opening, whereby lubricant from said source is drawn into the chamber to replace the previously discharged lubricant to charge the chamber for subsequent operation.

10. In a lubricating system, an expansion chamber, means for maintaining said chamber completely filled with lubricant, a conduit providing a connection from said chamber to a point to be lubricated, and means to heat the lubricant contained in said expansion chamber to cause expansion of the lubricant to thereby cause it to flow through said conduit to said part to be lubricated.

11. In a lubricating system, a completely filled lubricant container, means connecting said container with a point to be lubricated, means to apply heat intermittently to said container thereby to expand the lubricant and force it through said connecting means, means to prevent return flow of lubricant expelled from said container, and means to maintain said container completely filled with lubricant.

12. In a lubricating system, a main lubricant reservoir, a subsidiary lubricant reservoir positioned below said main reservoir and receiving the lubricant flow therefrom by gravity, branched distributing piping receiving lubricant from said subsidiary reservoir, heating means to alternately cause expansion and contraction of the lubricant contained therein, said subsidiary reservoir being provided with a valved connection to said main reservoir and with a valved connection to said piping, said first mentioned valved connection being opened upon the creation of a vacuum in said subsidiary reservoir and being closed upon the creation of a super-atmospheric pressure therein and said second mentioned valved connection being opened upon the creation of a super-atmospheric pressure in said subsidiary reservoir and being closed upon the creation of a vacuum therein, said first mentioned valved connection being float controlled to be opened upon depletion of the lubricant in said main reservoir.

13. In a mechanism, the combination of a heat source, and a lubricating means, said means comprising a chamber, said chamber having a substantially constant volume capacity regardless of temperature variations, means to maintain said chamber completely filled with lubricant to be distributed, said last means including a source of lubricant supply, and an automatically operated valve between said chamber and said reservoir, another automatically operated valve controlling the outlet from said chamber, the lubricant being drawn into and ejected from said chamber solely as a result of changing lubricant volume with temperature variations.

14. The combination of a chamber adapted to contain an expansible and contractible lubricant and designed to be subjected to the action of the hot exhaust gases of an internal-combustion engine, said chamber having a substantially constant volume capacity regardless of temperature variations, piping means equipped with a check-valve to deliver lubricant expelled from said chamber by the expansion of said lubricant, and means to maintain said chamber completely filled with lubricant including a reservoir provided with piping means fitted with a check-valve to permit the contraction of said lubricant to draw lubricant into said chamber.

WILLIAM D. BELL.